(12) United States Patent
Kim et al.

(10) Patent No.: US 12,441,918 B2
(45) Date of Patent: Oct. 14, 2025

(54) ADHESIVE COMPOSITION, AND POLARIZING PLATE AND DISPLAY DEVICE MANUFACTURED USING SAME

(71) Applicant: LG Chem, Ltd., Seoul (KR)

(72) Inventors: Kee Young Kim, Daejeon (KR); Min Ki Lee, Daejeon (KR); Dong Jo Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 850 days.

(21) Appl. No.: 17/607,220

(22) PCT Filed: Sep. 22, 2020

(86) PCT No.: PCT/KR2020/012757
§ 371 (c)(1),
(2) Date: Oct. 28, 2021

(87) PCT Pub. No.: WO2021/060796
PCT Pub. Date: Apr. 1, 2021

(65) Prior Publication Data
US 2022/0220348 A1    Jul. 14, 2022

(30) Foreign Application Priority Data

Sep. 27, 2019 (KR) .................. 10-2019-0120029

(51) Int. Cl.
| | | |
|---|---|---|
| *C09J 133/08* | (2006.01) | |
| *C08K 5/00* | (2006.01) | |
| *C08K 5/07* | (2006.01) | |
| *C08K 5/092* | (2006.01) | |
| *C08K 5/29* | (2006.01) | |
| *C08K 5/33* | (2006.01) | |
| *C08K 5/3412* | (2006.01) | |
| *C08K 5/37* | (2006.01) | |
| *C08K 5/54* | (2006.01) | |
| *C09J 133/06* | (2006.01) | |
| *G02B 5/30* | (2006.01) | |

(52) U.S. Cl.
CPC ......... *C09J 133/066* (2013.01); *C08K 5/0025* (2013.01); *C08K 5/07* (2013.01); *C08K 5/092* (2013.01); *C08K 5/29* (2013.01); *C08K 5/33* (2013.01); *C08K 5/3412* (2013.01); *C08K 5/37* (2013.01); *C08K 5/54* (2013.01); *C09J 133/08* (2013.01); *G02B 5/30* (2013.01); *G02B 5/3033* (2013.01); *C09J 2203/318* (2013.01); *C09J 2301/124* (2020.08); *C09J 2301/408* (2020.08); *C09J 2433/00* (2013.01)

(58) Field of Classification Search
None
See application file for complete search history.

(56) References Cited

U.S. PATENT DOCUMENTS

| | | | |
|---|---|---|---|
| 6,586,523 B1 * | 7/2003 | Blum ................ | C08G 18/0866 524/840 |
| 2014/0186554 A1 | 7/2014 | Jung et al. | |

FOREIGN PATENT DOCUMENTS

| | | | | |
|---|---|---|---|---|
| CN | 103509503 A | | 1/2014 | |
| EP | 403044 A | * | 12/1990 | ......... C08G 18/8096 |
| JP | 2011132297 A | | 7/2011 | |
| JP | 5098060 B2 | | 12/2012 | |
| JP | 2015074681 A | | 4/2015 | |
| JP | 2015101678 A | | 6/2015 | |
| JP | 2015183036 A | | 10/2015 | |
| JP | 2016098288 A | | 5/2016 | |
| JP | 2018070788 A | | 5/2018 | |
| KR | 101499247 B1 | | 3/2015 | |
| KR | 20180017015 A | | 2/2018 | |
| TW | 201406899 A | | 2/2014 | |

OTHER PUBLICATIONS

Machine translation of JP 2011132297 A (Year: 2011).*
Machine translation of JP 6417195 B2 (Year: 2016).*
Machine translation of CN 103509503 A (Year: 2014).*
Extended European Search Report for Application No. 20870332.2 dated Jun. 2, 2022. 7 pgs.
Internaitonal Search Report for PCT/KR2020/012757 dated Dec. 24, 2020, 2 pgs.

* cited by examiner

*Primary Examiner* — Frank D Ducheneaux
(74) *Attorney, Agent, or Firm* — Lerner David LLP

(57) ABSTRACT

The present invention relates to an acrylic adhesive composition, and a polarizing plate and a display device manufactured using the same, wherein the acrylic adhesive composition includes an acrylic copolymer formed by polymerizing a monomer mixture including a (meth)acrylic monomer and a (meth)acrylic monomer containing a hydroxy group, an isocyanate-based multi-functional curing agent, a curing retarder including a first curing retarder having a deblocking temperature of 110° C. or lower and a second curing retarder having a deblocking temperature of 130° C. or higher, and a silane coupling agent.

13 Claims, No Drawings

ADHESIVE COMPOSITION, AND POLARIZING PLATE AND DISPLAY DEVICE MANUFACTURED USING SAME

CROSS-REFERENCE TO RELATED APPLICATIONS

The present application is a national stage entry under 35 U.S.C. § 371 of International Application No. PCT/KR2020/012757 filed on Sep. 22, 2020, which claims priority from Korean Patent Application No. 10-2019-0120029, filed Sep. 27, 2019, the disclosures of which are incorporated herein in their entirety by reference.

TECHNICAL FIELD

The present invention relates to an adhesive composition, and a polarizing plate and a display device manufactured using the same, and more specifically, to an adhesive composition having improved adhesion force and durability by applying two kinds of curing retarders having different temperature sensitivity, and a polarizing plate and a display device manufactured using the same.

BACKGROUND ART

A polarizing plate is an optical element for making natural light or any polarized light into polarized light vibrating in a specific direction, and is applied to a display device such as a liquid crystal display (LCD) and an organic light emitting device.

A polarizing plate is generally composed of a polarizer including an iodine-based compound or a dichroic polarization material arranged in a predetermined direction and a protective film for protecting the polarizer. Typically, a triacetyl cellulose (TAC) film is generally attached on both surfaces a of a polarizer as a protective film. However, in recent years, the application of an acrylic protective film which is excellent in light properties and moisture blocking properties is expanding. In addition, for the purpose of preventing the curl of a polarizing plate and implementing a thin polarizing plate, there have been developed polarizing plates of a structure in which protective films made of different materials or having different thicknesses are attached on both surfaces of a polarizer or a protective film is attached only on one surface of a polarizer.

Due to the change in shrinkage and expansion properties of a polarizing plate caused by changes in the material of a protective film and the structure of upper and lower protective films, the importance of the adhesion force of an adhesive to hold the polarizing plate firmly is increasing. This is because when the adhesion force of an adhesion force decreases, a polarizing plate is separated and the like, so that durability is deteriorated. Also, display devices including a polarizing plate are used in various products such as portable products, vehicle-mounted products, outdoor meters, computers, televisions, and the like, and the application field thereof is more and more expanding. As the application field thereof is diversified as described above, an environment in which a display device is used is getting more severe. Accordingly, the display device is required to have high durability even in an environment having high temperature, high humidity and/or extreme change in temperature or humidity.

In order to improve the durability of a polarizing plate, a method of applying a curing agent to an adhesive composition for a polarizing plate, or a method of applying an acid-based copolymer having high adhesion force has been proposed, However, when an excessive amount of a curing agent is used to increase the degree of curing, adhesion force is reduced, which may cause the separation of a polarizing plate. When the content of a curing agent is reduced to increase adhesion force, due to the low degree of crosslinking, the cohesive force of an adhesive decreases under high-temperature/high-humidity conditions, resulting in generating bubbles. In addition, when an acid-based copolymer is applied, adhesion force increases but reworkability reduces, so that processability reduced.

DISCLOSURE OF THE INVENTION

Technical Problem

An aspect of the present invention provides an adhesive composition having excellent balance between physical properties such as the adhesion force of an adhesive and the reworkability thereof, and excellent durability even under high-temperature and high-temperature/high-humidity conditions.

Another aspect of the present invention provides a polarizing plate including an adhesive layer formed by the adhesive composition and a display device including the polarizing plate.

Technical Solution

According to an aspect of the present invention, there is provided an acrylic adhesive composition including an acrylic copolymer formed by polymerizing a monomer mixture including a (meth)acrylic monomer and a (meth) acrylic monomer containing a hydroxy group, an isocyanate-based multi-functional curing agent, at least two kinds of curing retarders having different deblocking temperatures, and a silane coupling agent. At this time, the curing retarder includes a first curing retarder having a deblocking temperature of 110° C. or lower and a second curing retarder having a deblocking temperature of 130° C. or higher.

According to another aspect of the present invention, there is provided a polarizing plate including a polarizing film and an adhesive layer formed on one surface or both surfaces of the polarizing film and including a cured product of an adhesive composition for a polarizing plate according to the present invention.

According to yet another aspect of the present invention, there is provided a display device including the polarizing plate of the present invention.

Advantageous Effects

An adhesive composition according to the present invention includes two kinds of curing retarders having different deblocking temperatures, thereby preventing gelation in the adhesive composition. When attached to a polarizing plate, the composition delays curing, thereby allowing adhesion force to be maintained excellent, and when exposed to high temperatures or the like after being attached to the polarizing plate, the composition allows additional curing to performed, thereby implementing excellent durability.

BEST MODE FOR CARRYING OUT THE INVENTION

Hereinafter, the present invention will be described in detail.

In the present specification, when terms such as 'include', 'has', and 'is composed of' are used, other parts may be added unless 'only' is used. Elements of a singular form may include elements plural forms unless the context clearly indicates otherwise.

In interpreting elements, it is to be construed as including an error range even if there is no separate explicit recitation.

In the present specification, '(meth)acrylic₁ is a generic term for acrylic and meth acrylic. For example, (meth)acrylate includes methacrylate and acrylate, and (meth)acrylic acid includes acrylic acid and methacrylic acid.

In the present specification, the term 'X to Y₁ indicating a range refers to 'equal to or more than X to equal to or less than Y₁.

Hereinafter, an adhesive composition according to the present invention will be described in detail.

Adhesive Composition (1) Acrylic Copolymer

An adhesive composition according to the present invention includes an acrylic copolymer formed by polymerizing a monomer mixture containing a (meth)acrylic monomer and a (meth)acrylic monomer containing a hydroxy group.

The (meth)acrylic monomer is a component to impart adhesion for force, and may be, example, an alkyl (meth)acrylate monomer, and more specifically, may be methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, tetradecyl(meth)acrylate, or a mixture thereof.

The (meth)acrylic monomer may be included in an amount of 80 parts by weight to 99 parts by weight, preferably 85 to 99 parts by weight, more preferably 90 to 99 parts by weight based on 100 parts by weight of the monomer mixture. When the content of the (meth)acrylic monomer satisfies the above range, excellent adhesion and durability may be obtained.

Next, the (meth)acrylic monomer containing a hydroxy group is to improve the adhesion force of the adhesive composition and to form a crosslinked structure by reacting with a curing agent to be described later, and may be, for example, 2-hydroxyethyl (meth)acrylate, 2-hydroxypropyl (meth)acrylate, 4-hydroxybutyl (meth)acrylate, 6-hydroxyhexyl(meth)acrylate, 8-hydroxyoctyl(meth)acrylate, 2-hydroxyethylene glycol (meth)acrylate, 2-hydroxypropylene glycol (meth)acrylate, or a mixture thereof, but is not limited thereto.

The (meth)acrylic monomer including a hydroxy group may be included in 1 to 10 parts by weight, preferably 1 to 7 parts by weight, and more preferably 1 to 5 parts by weight based on 100 parts by weight of the monomer mixture. When the content of the (meth)acrylic monomer containing a hydroxy group satisfies the above range, cohesive properties may be obtained. When the content is less than 1 part by weight, an adhesive is destroyed when reworked, and when greater than 10 parts by weight, adhesion force may be deteriorated.

Meanwhile, the monomer mixture may further include, if necessary, a co-monomer in addition to the (meth)acrylic monomer and the hydroxy group-containing (meth)acrylic monomer as long as the physical properties of the adhesive composition is not inhibited.

Examples of the co-monomer may include, for example, one or more of a nitrogen-containing monomer such as (meth)acrylonitrile, (meth)acrylamide, N-methyl (meth)acrylamide, N-butoxy methyl (meth)acrylamide, N-vinyl pyrrolidone or N-vinyl caprolactam, a styrene-based monomer such as styrene or methyl styrene, glycidyl (meth)acrylate, or a carboxylic acid vinyl ester such as vinyl acetate, and the like, but are not limited thereto. The content of the co-monomer may preferably be 20 parts by weight or less based on 100 parts by weight of the monomer mixture. When the content of the co-monomer exceeds 20 parts by weight, the adhesive physical properties may be deteriorated.

Meanwhile, a method for polymerizing the monomer mixture is not particularly limited. Various polymerization methods known in the art, such as solution polymerization, photo polymerization, bulk polymerization, suspension polymerization, and emulsion polymerization may be used. During the polymerization, a polymerization initiator, a molecular weight control agent and the like may be additionally added. The injection time of each component is not particularly limited. That is, the components may be injected all at once, or may be injected at different times in installments.

In the present invention, an acrylic copolymer may be prepared by solution polymerization, in particular. It is preferable that the solution polymerization is performed by adding an initiator, a molecular weight control agent and the like at a polymerization temperature of 50° C. to 140° C. in the state in which each monomer is uniformly mixed. Examples of the initiator which can be used in the process may include conventional initiators, for example, an azo-based initiator such as azobisisobutyronitrile and azobiscyclohexane carbonitrile and the like; and/or peroxide such as benzoyl peroxide and acetyl peroxide. Any one thereof or a mixture of two or more thereof may be used, but the initiator is not limited thereto. In addition, as the molecular weight control agent, mercaptans such as dodecylmercaptan and n-dodecylmercaptan, terpenes such as dipentene and t-terpene, chloroform, or halogenated hydrocarbon of carbon tetrachloride, or pentaerythritoltetrakis 3-mercapto propionate, and the like may be used. However, the molecular weight control agent is not limited thereto.

Meanwhile, the acrylic copolymer of the present invention prepared as described above may have a weight average molecular weight of 1,000,000 to 2,500,000 g/mol, preferably 1,200,000 to 2,000,000 g/mol. When the weight average molecular weight of the acrylic copolymer satisfies the above range, excellent durability may be implemented.

(2) Polyfunctional Curing Agent

The adhesive composition according to the present invention includes an isocyanate-based polyfunctional curing agent.

The multifunctional curing agent is for improving the durability of an adhesive layer by reacting with a hydroxy group in the acrylic copolymer, thereby forming a crosslinked structure, and may be, for example, toluene diisocyanate, 2,4-trilene diisocyanate, 2,6-trilene diisocyanate, hydrogenated trilene diisocyanate, isoform diisocyanate, 1,3-xylene diisocyanate, 1,4-xylene diisocyanate, diphenylmethane-4,4-diisocyanate, 1,3-bisisocyanatomethyl cyclohexane, tetramethyl xylylene diisocyanate, 1,5-naphthalene diisocyanate, hexamethylene diisocyanate, 2,2,4-trimethylhexamethylene diisocyanate, 2,4,4-trimethylhexamethylene diisocyanate, trimethylolpropane-modified toluene diisocyanate, trimethylolpropane-modified tolylene diisocyanate, trilene diisocyanate adduct of trimethylolpropane, xylenediosocyanate adduct of trimethylolpropane, toriphenylmethane triisocyanate, methylene bistriisocyanate, a polyol (trimethylol propane) thereof, or a mixture thereof, and the like.

The isocyanate-based polyfunctional curing agent may be included in an amount of 0.01 to 5 parts by weight, preferably 0.01 to 3 parts by weight, and more preferably 0.05 to 2 part by weight based on 100 parts by weight of the acrylic copolymer.

When the content of the isocyanate-based polyfunctional curing agent is less than 0.01 parts by weight, a crosslinking effect is not expected to be achieved. When greater than 5 parts by weight, cohesive force increases, which may cause gelation.

(3) Curing Retarder

The adhesive composition according to the present invention includes at least two kinds of curing retarders having different deblocking temperatures. A curing retarder is a material bonded to a curing agent to delay the progress of a curing reaction. When a curing retarder is included, the curing reaction proceeds slowly due to the curing retarder during the process of forming an adhesive layer, so that the decrease in adhesion force due to the curing reaction may be suppressed. However, when a curing retarder remains, there is a problem in that the curing reaction is not sufficiently performed, so that when exposed to high temperatures or the like, durability is deteriorated.

The present invention uses two kinds of curing retarders having different deblocking temperatures in order to solve the above problem. Specifically, in the present invention, the curing retarder may include a first curing retarder having a deblocking temperature of 110° C. or lower and a second curing retarder having a deblocking temperature of 130° C. or higher.

The first curing retarder having a deblocking temperature of 110° C. or lower is bonded to a curing agent when the adhesive composition is blended and interferes with a curing process, thereby preventing gelation in the adhesive composition. The first curing retarder is deblocked in the process of forming an adhesive layer performed under the temperature condition of 110 to 120° C., and the curing delaying effect disappears. Meanwhile, the second curing retarder having a deblocking temperature of 130° C. or higher remains bonded to the curing agent without being deblocked even during the formation of the adhesive layer and delays the curing process, thereby serving to suppress the decrease in adhesion force due to the curing reaction. The second curing retarder is deblocked when a polarizing plate and a panel are bonded, when a panel is assembled, and/or when exposed to high temperatures. Accordingly, an additional curing reaction is performed when exposed to high temperatures, so that an effect of improving high-temperature durability of the polarizing plate may be obtained. In addition, the deblocked second curing retarder reacts with an OH group of a silane coupling agent to be described later and an OH group on the surface of a panel to increase adhesion of the adhesive layer, thereby serving to improve high-temperature durability as well.

Preferably, the first curing retarder may have a deblocking temperature of 70° C. to 110° C., and the second curing retarder may have a deblocking temperature of 130° C. to 160° C.

In the present invention, the first curing retarder may be one or more selected from the group consisting of acetylacetone, diethylmalonate, and methylethylketoxime.

In addition, the second curing retarder may be one or more selected from the group consisting of acetone oxime, caprolactam and an alkylmercaptan-based compound. Among these, acetone oxime having excellent solubility for the adhesive composition is particularly preferred.

Meanwhile, the curing retarder may be included in an amount of 1 part by weight to 5 parts by weight, preferably 1 part by weight to 4 parts by weight based on 100 parts by weight of the acrylic copolymer. When the content of the curing retarder is less than 1 part by weight, the effect of improving adhesion force is insignificant. When greater than 5 parts by weight, the deterioration in adhesion force due to an excessive amount of the curing retarder and the deterioration in durability due to the generation bubbles may be caused. At this time, the content of the curing retarder means the sum of the content of the first curing retarder and the content of the second curing retarder.

Meanwhile, the first curing retarder and the second curing retarder may be included in a weight ratio of 1:1 to 5:1, preferably 1:1 to 4:1. When the weight ratio of the first curing retarder and the second curing retarder satisfies the above range, the balance among adhesion force, rework force, and durability is excellent.

(4) Silane Coupling Agent

The adhesive composition of the present invention includes a silane coupling agent. The silane coupling agent is for improving the adhesion among an adhesive, a polarizing plate and an adherend, and is preferably an alkoxy silane-based coupling agent.

For example, the silane coupling agent may be γ-triethoxy silane, γ-glycidoxypropyl trimethoxy silane, γ-glycidoxypropyl methylethoxy silane, γ-glycidoxypropyl triethoxy silane, 3-mercaptopropyl trimethoxy silane, vinyl trimethoxysilane, vinyl triethoxy silane, γ-methacryloxypropyl trimethoxy silane, γ-methacryloxypropyl triethoxy silane, γ-aminopropyl trimethoxy silane, γ-aminopropyl triethoxy silane, 3-isocyanatopropyl triethoxy silane, γ-acetoacetyl propyltrimethoxysilane, γ-acetoacetyl propyltriethoxysilane, β-cyanoacetyl trimethoxy silane, β-cyanoacetyl triethoxy silane, and acetoxyacetato trimethoxy silane, and any one thereof or a mixture of two or more thereof may be used.

In the composition of the present invention, the silane coupling agent may be included in an amount of 0.01 parts by weight to 1 part by weight, preferably 0.01 parts by weight to 0.5 part by weight based on 100 parts by weight of the acrylic copolymer. When the content of the coupling agent is less than 0.01 parts by weight, the effect of increasing adhesion is insignificant. When greater than 1 part by weight, durability may be deteriorated.

(5) Other Components

In order to control physical properties, the adhesive composition of the present invention may further include other components, such as a solvent, an anti-static agent, a cross-linking catalyst, an adhesive-imparting resin, and an additive, in addition to the components described above.

The adhesive composition of the present invention may further include a solvent for controlling viscosity. At this time, the solvent may be, for example, ethyl acetate, n-pentane, isopentane, neopentane, n-hexane, n-octane, n-heptane, methyl ethyl ketone, acetone, toluene, or a combination thereof, but is not limited thereto.

The adhesive composition of the present invention may further include a crosslinking catalyst. The crosslinking catalyst is for promoting curing (crosslinking) of an adhesive layer. When the crosslinking catalyst is included in the adhesive composition, there is an advantage in that it is not necessary to perform a separate aging process after forming an adhesive layer. The crosslinking catalyst may be, for example, bis(tri-n-butyltin) oxide, bis(tri-n-butyltin) sulfate, di-n-butyldiphenyltin, di-n-butyltinbis(acetylacetonate), di-n-butyltinbis(2-ethylhexanoate), di-n-butyltindichloride, di-n-butyltindilaurate, di-n-butyltinoxide, dimethyldiphenyltin, dimethyltin dichloride, diphenyltin dichloride, diphenyltinoxide, hexa-n-butyltin, hexaphenyltin, tetra-n-butyltin, tetraphenyltin, tin(II)acetate, tin(II)acetylacetonate, tin chloride (II), tin iodide(II), tin(II)oxalate, and the like may be used, but is not limited thereto.

Meanwhile, the crosslinking catalyst may be included in an amount of 0.001 parts by weight to 0.5 parts by weight, preferably 0.001 parts by weight to 0.1 parts by weight based on 100 parts by weight of the acrylic copolymer. When the content of the crosslinking catalyst is less than 0.001 parts by weight, the effect of promoting curing is insignificant. When greater than 0.5 parts by weight, durability may be deteriorated.

In terms of controlling adhesion performance, the adhesive composition of the present invention may further include 1 part by weight to 100 parts by weight of an adhesive-imparting resin based on 100 parts by weight of the acrylic copolymer. The type of the adhesive-imparting resin is not particularly limited. For example, any one of or a mixture of two or more of (hydrogenated) hydrocarbon-based resin, (hydrogenated) rosin resin, (hydrogenated) rosin ester resin, (hydrogenated) terpene resin, (hydrogenated) terpene phenol resin, polymerized rosin resin, or polymerized rosin ester resin, and the like, may be used. When the content of the adhesive-imparting resin is less than 1 part by weight, the effect of adding the adhesive-imparting resin may be insignificant. When greater than 100 parts by weight, the effect of improving compatibility and/or cohesion may be deteriorated.

The adhesive composition of the present invention may further include one or more additives selected from the group consisting of an anti-static agent, an epoxy resin, a curing agent, an ultraviolet stabilizer, an anti-oxidation agent, a coloring agent, a reinforcing agent, a filler, an anti-foaming agent, a surfactant, and a plasticizer, to the extent that the effect of the invention is not affected.

Polarizing Plate

Next, a polarizing plate according to the present invention will be described.

The present invention also relates to a polarizing plate including a polarizing film and an adhesive layer formed on one surface or both surfaces of the polarizing film and containing a cured product of the adhesive composition according to the present invention described above.

The type of the polarizing film used in the present invention is not particularly limited. A typical type known in the art may be employed. For example, the polarizing film may include a polarizer and a protective film formed on one surface or both surfaces of the polarizer.

The type of the polarizer included in the polarizing plate of the present invention is not particularly limited. For example, a typical type known in the art, such as polyvinyl alcohol-based polarizer, will be employed without limitation.

The polarizer is a functional film or sheet capable of extracting only the light which vibrates in one direction from light which is incident while vibrating in various directions. The polarizer as described above may be, for example, in the form in which a dichroic pigment is adsorbed onto a polyvinyl alcohol-based resin film. The polyvinyl alcohol-based resin constituting the polarizer may be obtained, for example, by gelling a polyvinyl acetate-based resin. In this case, the polyvinyl acetate-based resin to be used may include a homopolymer of vinyl acetate as well as a copolymer of vinyl acetate and another monomer co-polymerizable with the same. Examples of the monomer co-polymerizable with vinyl acetate include a mixture of one or two or more of an unsaturated carboxylic acid, an olefin, a vinyl ether, an unsaturated sulfonic acid, an acrylamide having an ammonium group, and the like, but are not limited thereto. The degree of gelation of the polyvinyl alcohol-based resin is typically 85 mol % to 100 mol %, preferably 98 mol % or greater. The polyvinyl alcohol-based resin may further be modified. For example, polyvinyl formal or polyvinyl acetal modified with an aldehyde group may also be used. Also, the degree of polymerization of the polyvinyl alcohol-based resin may typically be 1,000 to 10,000, preferably 1,500 to 5,000.

The polyvinyl alcohol-based resin described above may be formed into a film to be used as a disc film of the polarizer. A method for forming the polyvinyl alcohol-based resin into a film is not particularly limited. A typical method known in the art may be used.

The thickness of the disc film defilmed with the polyvinyl alcohol-based resin is not particularly limited, and may appropriately be controlled, for example, in the range of 1 μm to 150 μm. In consideration of the ease of stretching and the like, the thickness of the disc film may be controlled to be 10 μm or greater.

The polarizer may be manufactured by stretching (ex. uniaxial stretching) the polyvinyl alcohol-based resin film described above, and then dyeing the stretched polyvinyl alcohol-based resin film with a dichroic dye and allowing the dichroic dye to be adsorbed, followed by treating the polyvinyl alcohol-based resin film adsorbed with the dichroic dye with a boric acid aqueous solution, and performing washing after the treatment with the boric acid aqueous solution. In the above, as the dichroic pigment, iodine or a dichroic organic dyes and the like may be used.

The polarizing film of the present invention may also include a protective film formed on one surface or both surfaces of the polarizer. The type of the protective film that may be included in the polarizing plate of the present invention is not particularly limited. For example, the protective film may be formed of a multi-layered film in which protective films composed of a cellulose-based film such as triacetyl cellulose, a polyester-based film such as a polycarbonate film or a polyethylene terephthalate film, a polyether sulfone-based film, and/or a polyethylene film, a polypropylene film, or a polyolefin film having a cyclo-based or norbornene-based structure, or a polyolefin-based film such as an ethylene propylene copolymer, and/or a polyacrylic film such as a (meth)acrylate copolymer are laminated. At this time, the thickness of the protective film is not particularly limited, either. The protective film may be formed to a typical thickness.

In the present invention, a method for forming an adhesive layer on the polarizing film is not particularly limited. For example, a method of applying and curing an adhesive composition (coating liquid) on the film or a device by a typical means such as a bar coater, or a method of applying and curing an adhesive composition on the surface of a peelable base material, and then transferring a formed adhesive layer to the surface of a polarizing film or the device.

In the present invention, a process of forming an adhesive layer is preferably performed after sufficiently removing a volatile component, or a bubble-inducing component such as reaction residues inside the adhesive composition (coating liquid). As a result, a problem in which the crosslinking density or molecular weight of the adhesive is too low, thereby lowering the elastic modulus, or bubbles present between a glass plate and the adhesive layer become bigger, thereby forming a scatterer therein may be prevented.

In addition, a method for curing the adhesive composition of the present invention when manufacturing a polarizing plate is not particularly limited also. For example, the adhesive layer may be maintained at an appropriate temperature so that a crosslinking reaction between the acrylic copolymer contained in the composition and the curing agent may be induced.

The polarizing plate of the present invention may further include one or more functional layers selected from the group consisting of a protective layer, a reflective layer, an anti-glare layer, a phase difference plate, a wide viewing angle compensation film, and a brightness enhancement film.

Display Device

Next, a display device according to the present invention will be described.

The display device of the present invention includes the above-described polarizing plate according to the present invention.

More specifically, the display device may be a liquid crystal display device including a liquid crystal panel having the polarizing plate according to the present invention bonded on one surface or both surfaces thereof. At this time, the type of the liquid crystal panel is not particularly limited. In the present invention, any known liquid crystal panel may be applied without being limited to the type thereof. For example, a liquid crystal panel of various passive matrix methods including a twisted neumatic (TN) type, a super twisted neutral (STN) type, a ferroelectric (F) type, and a polymer dispersed (PD) LCD type, a liquid crystal panel of various active matrix systems including a two terminal-type and a three terminal-type, an IPS mode panel, or a VA mode panel may be applied. In addition, the type and manufacturing method of other configurations included in the liquid crystal display device of the present invention particularly limited.

Common configurations in the field may be employed and used without limitation.

MODE FOR CARRYING OUT THE INVENTION

Hereinafter, Examples of the present invention will be described in detail so that those skilled in the art may easily carry out the present invention. However, the present invention may be embodied in many different forms, and is not limited to Examples set forth herein.

Preparation Example 1: Acrylic Copolymer (A)

To a 3 L reactor in which nitrogen gas is refluxed and a cooling device is installed to facilitate temperature control, a monomer mixture containing 93 parts by weight of butyl acrylate (BA), 5 parts by weight of methyl methacrylate (MMA), and 2 parts by weight of hydroxybutyl acrylate (HBA) were introduced. Thereafter, 120 parts by weight of ethyl acetate (EAc) was introduced thereto as a solvent. Thereafter, nitrogen gas was purged for 30 minutes to remove oxygen, and then the temperature was maintained at 60° C. Thereafter, the mixture was reacted for 12 hours while further introducing 0.025 parts by weight of n-dodecylmercaptan (n-DDM) as a molecular weight control agent and 0.03 parts by weight of azobis(2,4-dimethylvaleronitrile) (V-65, Manufacturer: Wako) as a polymerization initiator thereto to prepare an acrylic copolymer (A).

Preparation Example 2: Acrylic Copolymer (B)

To a 3 L reactor in which nitrogen gas is refluxed and a cooling device is installed to facilitate temperature control, a monomer mixture containing 96.5 parts by weight of butyl acrylate (BA), 3 parts by weight of hydroxyethyl acrylate (HEA), and 0.5 parts by weight of hydroxybutyl acrylate (HBA) were introduced. Thereafter, 120 parts by weight of ethyl acetate (EAc) was introduced thereto as a solvent. Thereafter, nitrogen gas was purged for 30 minutes to remove oxygen, and then the temperature was maintained at 60° C. Thereafter, the mixture was reacted for 12 hours while further introducing 0.01 parts by weight of n-dodecylmercaptan (n-DDM) as a molecular weight control agent and 0.03 parts by weight of azobis(2,4-dimethylvaleronitrile) (V-65, Manufacturer: Wako) as a polymerization initiator thereto to prepare an acrylic copolymer (B).

Preparation Example 3: Acrylic Copolymer (C)

To a 3 L reactor in which nitrogen gas is refluxed an acrylic a cooling device is installed to facilitate temperature control, a monomer mixture containing 94 parts by weight of butyl acrylate (BA) and 6 parts by weight of acrylic acid (AA) were introduced. Thereafter, 120 parts by weight of ethyl acetate (EAc) was added thereto as a solvent. Thereafter, nitrogen gas was purged for 30 minutes to remove oxygen, and then the temperature was maintained at 62° C. Thereafter, the mixture was reacted for 10 hours while further introducing 0.01 parts by weight of n-dodecylmercaptan (n-DDM) as a molecular weight control agent and 0.03 parts by weight of azobis(2-4-dimethylvaleronitrile) (V-65, Manufacturer: Wako) as a polymerization initiator thereto to prepare an acrylic copolymer (C).

The weight average molecular weight of the acrylic copolymer prepared in each of Preparation Examples 1 to 3 was measured under the following conditions using GPC. In making a calibration curve, the measurement results were converted using standard polystyrene of the Agilent system.

<Measurement Conditions>

Measurement device: Agilent GPC (Agulent 1200 series, USA)

Column: Two PL Mixed B connections

Column temperature: 40° C.

Eluent: tetrahydrofuran

Flow rate: 1.0 mL/min

Concentration: ~ 1 mg/mL (100 µL injection)

TABLE 1

|  |  | Preparation Example 1 | Preparation Example 2 | Preparation Example 3 |
|---|---|---|---|---|
| Acrylic copolymer |  | A | B | C |
| Monomer mixture | BA | 93.0 | 96.5 | 94.0 |
|  | MMA | 5 | — | — |
|  | HEA | — | 3 | — |
|  | HBA | 2 | 0.5 | — |
|  | AA | — | — | 6 |
| Weight average molecular weight (Mw) |  | 160 million | 180 million | 160 million |

Example 1

100 parts by weight of the acrylic copolymer (A) prepared as described above, 0.10 parts by weight an isocyanate-based curing agent (Coronate L, manufactured by NPU Co., Ltd.), 0.9 parts by weight of acetylacetone as the first curing retarder, 0.6 parts by weight of acetone oxime as the second curing retarder, 0.35 parts by weight of a silane coupling agent (AD-M812, LG Chem), 1.5 parts by weight of an anti-static agent (HQ-115A, 3M Co., Ltd.), and 0.01 parts by weight of a crosslinking catalyst (Sigma-Aldrich, Dibutyltindilaurate) were mixed to prepare an adhesive composition.

The prepared adhesive composition was applied on a release-treated surface of a release-treated polyethylene terephthalate (release PET) film having a thickness of 38 μm such that the thickness thereof after being dried would be 23 μm, and then dried for 3 minutes at 110° C. to form an adhesive layer. Thereafter, the adhesive layer was laminated on a polarizing plate to manufacture a polarizing plate including an adhesive layer.

Examples 2 to 8 and Comparative Examples 1 to 7

An adhesive composition and a polarizing plate were prepared in the same manner as in Example 1 except that the types and contents of each component were changed as described in [Table 2] and [Table 3].

TABLE 2

|  |  | Example 1 | Example 2 | Example 3 | Example 4 | Example 5 | Example 6 | Example 7 | Example 8 |
|---|---|---|---|---|---|---|---|---|---|
| Acrylic copolymer | | A 100 | A 100 | A 100 | A 100 | B 100 | B 100 | B 100 | B 100 |
| Isocyanate-based curing agent | | 0.10 | 0.15 | 0.15 | 0.20 | 0.10 | 0.10 | 0.90 | 0.10 |
| First curing retarder | Acetylacetone | 0.9 | 2.0 | — | — | 0.5 | — | 2.5 | — |
| | Diethylmalonate | — | — | 1.5 | 3.2 | — | — | — | 4.0 |
| | Methylethylketoxime | — | — | — | — | — | 0.4 | — | — |
| Second curing retarder | Acetoneoxime | 0.6 | 0.5 | 0.6 | 1 | 0.5 | 0.6 | 1.5 | 1.5 |
| Silane coupling agent | | 0.35 | 0.45 | 0.35 | 0.50 | 0.45 | 0.50 | 0.15 | 0.50 |
| Anti-static agent | | 1.5 | 1.5 | 1.5 | 1.5 | 1.5 | 1.5 | 1.5 | 1.5 |
| Crosslinking catalyst | | 0.01 | 0.01 | 0.01 | 0.01 | 0.01 | 0.01 | 0.01 | 0.01 |

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Acrylic copolymer | | A 100 | A 100 | A 100 | B 100 | A 100 | B 100 | C 100 |
| Isocyanate-based curing agent | | 0.09 | 0.20 | 0.15 | 0.90 | 0.20 | 0.10 | 2.50 |
| First curing retarder | Acetylacetone | — | 2.5 | 2.0 | — | — | — | — |
| | Diethylmalonate | — | — | — | — | 4 | — | — |
| | Methylethylketoxime | — | — | — | — | — | 1 | — |
| Second curing retarder | Acetoneoxime | 1.5 | — | 0.5 | — | — | — | — |
| Silane coupling agent | | 0.50 | 0.45 | — | 0.15 | 0.50 | 0.50 | 0.35 |
| Anti-static agent | | 1.5 | 1.5 | 1.5 | 1.5 | 1.5 | 1.5 | 1.5 |
| Crosslinking catalyst | | 0.01 | 0.01 | 0.01 | 0.01 | 0.01 | 0.01 | — |

The physical properties of the adhesive layer and the polarizing plate prepared in each of Examples 1 to 8 and Comparative Examples 1 to 7 were measured by the following method, and the measurement results are shown in Table 4 to Table 5 below.

Method for Measuring Physical Properties (1) Gel Fraction (%)

Samples were collected from the adhesive layers formed in Examples and Comparative Examples, and the weight $W_0$ of the samples was measured. Thereafter, ethyl acetate was added to the collected adhesive layer samples and dissolved for 72 hours, filtered through a 400 mesh stainless steel mesh of $W_3$ (g), and then dried at 150° C. for 30 minutes. Thereafter, the total weight $W_2$ (g) of the stainless steel mesh and residues was measured. A value obtained by subtracting the weight $W_3$ of the stainless steel mesh from the total weight $W_2$ was referred to as $W_1$, and $W_0$ and $W_1$ were substituted in Equation (1) below to obtain a gel fraction.

$$\text{Gel fraction (\%)} = (W_1/W_0) \times 100 \qquad \text{Equation (1):}$$

(2) Evaluation of Adhesion Force

The polarizing plate manufactured in each of Examples and Comparative Examples was stored for 4 days under the constant temperature/humidity conditions (23° C., 50% R.H.), and then was cut to a size of 25 mm in width and 100 mm in length to prepare a specimen. Thereafter, the release PET film attached to the adhesive layer was peeled off, and the polarizing plate was attached to an alkali-free glass using a 2 kg roller in accordance with JIS Z 0237 regulation to prepare a specimen for measurement.

The specimen for measurement was stored for 4 hours under the constant temperature/humidity conditions (23° C., 50% R. H.). Thereafter, using a texture analyzer (TA, manufactured by Stable Micro Systems, UK), a force required to completely separate a polarizing plate f from a glass substrate by pulling the polarizing plate at a peeling rate of 300 mm/min and a peeling angle of 180° was measured to evaluate adhesion force (unit: gf/25 mm).

(3) Evaluation of Reworkability

The polarizing plate manufactured in each of Examples and Comparative Examples was stored for 1 days under the constant temperature/humidity conditions (23° C., 50% R. H.), and then was cut to a size of 25 mm in width and 100 mm in length to prepare a specimen. Thereafter, the release PET film attached to the adhesive layer was peeled off, and the polarizing plate was attached to an alkali-free glass using a 2 kg roller in accordance with JIS Z 0237 regulation to prepare a specimen for measurement.

Thereafter, the specimen for measurement was stored for 1 hour at 80° C., and then was stored for 1 hour under the constant temperature/humidity conditions (23° C., 50% R. H.). Thereafter, using a texture analyzer (TA, manufactured by Stable Micro Systems, UK), a force required to completely separate a polarizing plate from a glass substrate by pulling the polarizing plate at a peeling rate of 300 mm/min and a peeling angle of 180° was measured to measure rework force (unit: gf/25 mm), and reworkability was evaluated based on the following criteria.

<Evaluation Criteria>

○: When rework force is less than 1,500 gf/25 mm

Δ: When rework force is 1,500 gf/25 mm to less than 2,500 gf/25 mm

X: When rework force is 2, 500 gf/25 mm or greater (4) Durability Evaluation

The polarizing plate manufactured in each of Examples and Comparative Examples was attached on an alkali-free glass substrate and then stored in an autoclave (50° C. and 5 atmospheric pressure) for about 20 minutes to produce a specimen for measurement.

The produced specimens for measurement were left to stand for 500 hours at a temperature of 80° C. and 95° C., respectively, and then the occurrence of bubbles or peeling was observed with the naked eye to evaluate heat resistance durability.

In addition, the produced specimens for measurement were left to stand for 500 hours at a temperature of 60° C. and a relative humidity of 90%, and at a temperature of 65° C. and a relative humidity of 95%, respectively, and then the occurrence of bubbles or peeling was observed with the naked eye to evaluate moisture and heat resistance durability.

<Evaluation Criteria>

○: No bubbles and peeling observed

X: Bubbles and/or peeling observed

TABLE 4

|  |  | Example 1 | Example 2 | Example 3 | Example 4 | Example 5 | Example 6 | Example 7 | Example 8 |
|---|---|---|---|---|---|---|---|---|---|
| Gel (%) |  | 68 | 75 | 72 | 77 | 67 | 65 | 82 | 65 |
| Adhesion force (gf/in) |  | 380 | 240 | 310 | 240 | 360 | 380 | 350 | 380 |
| Reworkability |  | ○ | ○ | ○ | ○ | ○ | ○ | ○ | ○ |
| Heat resistant | 80° C. | ○ | ○ | ○ | ○ | ○ | ○ | ○ | ○ |
| durability | 95° C. | ○ | ○ | ○ | ○ | ○ | ○ | ○ | ○ |
| Moisture and | 60° C., 90% RH | ○ | ○ | ○ | ○ | ○ | ○ | ○ | ○ |
| heat resistance durability | 65° C., 95% RH | ○ | ○ | ○ | ○ | ○ | ○ | ○ | ○ |

TABLE 5

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Gel (%) |  | 45 | 79 | 73 | 85 | 79 | 70 | 81 |
| Adhesion force (gf/in) |  | 720 | 230 | 240 | 290 | 230 | 340 | 960 |
| Reworkability |  | x | ○ | ○ | ○ | ○ | ○ | x |
| Heat resistant | 80° C. | x | ○ | ○ | ○ | ○ | ○ | ○ |
| durability | 95° C. | x | x | ○ | x | x | x | ○ |
| Moisture and | 60° C., 90% RH | x | ○ | ○ | ○ | ○ | ○ | ○ |
| heat resistance durability | 65° C., 95% RH | x | ○ | x | ○ | ○ | ○ | ○ |

As shown in Table 4 above, the polarizing plate manufactured by using the adhesive composition of each of Examples 1 to 8 had sufficient adhesion force, and also had excellent reworkability, heat resistant durability, and moisture and heat resistant durability. On the contrary, as shown in Table 5 above, the polarizing plate manufactured by using the adhesive composition of Comparative Example 1 in which only the second curing retarder was used and the first curing retarder was not included had adhesion force too high, making it difficult to rework, and had poor durability under high-temperature and high-temperature/high-humidity conditions.

Meanwhile, the polarizing plate manufactured by using the adhesive composition of each of Comparative Examples 2, 5, and 6 in which only the first curing retarder was used and the second curing retarder was not included had good adhesion force and reworkability, but had poor heat resistance durability at 95° C.

Meanwhile, the polarizing plate manufactured by using the adhesive composition of Comparative Example 3 in which the silane coupling agent was not used had good adhesion force and reworkability, but had poor moisture and heat resistance durability.

In addition, the polarizing plate manufactured by using the adhesive composition of Comparative Example 4 in which the curing retarder was not used had good adhesion force and reworkability, but had poor heat resistance durability at 95° C. The polarizing plate manufactured by using the adhesive composition of Comparative Example 7 in which an acid-based copolymer was used as the acrylic copolymer had adhesion force too high, so that the reworkability thereof was significantly reduced.

The invention claimed is:

1. An acrylic adhesive composition comprising:
    an acrylic copolymer formed by polymerizing a monomer mixture including a (meth)acrylic monomer and a (meth)acrylic monomer containing a hydroxy group;
    an isocyanate-based multi-functional curing agent;
    a curing retarder comprising at least two kinds of curing retarders having different deblocking temperatures; and
    a silane coupling agent,
    wherein the curing retarder comprises a first curing retarder having a deblocking temperature of 110° C. or lower and a second curing retarder having a deblocking temperature of 130° C. or higher, and
    the first curing retarder and the second curing retarder are included in a weight ratio of 1:1 to 5:1, and
    wherein the acrylic adhesive composition does not comprise a peroxide.

2. The acrylic adhesive composition of claim 1, wherein the first curing retarder has a deblocking temperature of 70° C. to 110° C., and the second curing retarder has a deblocking temperature of 130° C. to 160° C.

3. The acrylic adhesive composition of claim 1, wherein the first curing retarder is one or more selected from the group consisting of acetylacetone, diethylmalonate, and methylethylketoxime.

4. The acrylic adhesive composition of claim 1, wherein the second curing retarder is one or more selected from the group consisting of acetone oxime, caprolactam and an alkylmercaptan-based compound.

5. The acrylic adhesive composition of claim 1, wherein the second curing retarder is acetone oxime.

6. The acrylic adhesive composition of claim 1, wherein the silane coupling agent is an alkoxy silane-based coupling agent.

7. The acrylic adhesive composition of claim 1, wherein the acrylic copolymer has a weight average molecular weight of 1,000,000 to 2,500,000 g/mol.

8. The acrylic adhesive composition of claim 1, wherein the isocyanate-based multi-functional curing agent is included in an amount of 0.01 to 5 parts by weight, the curing retarder is included in an amount of 1 to 5 parts by weight, and the silane coupling agent is included in an amount of 0.01 to 1 part by weight, based on 100 parts by weight of the acrylic copolymer.

9. The acrylic adhesive composition of claim 1, wherein the (meth)acrylic monomer is included in an amount of 80 parts by weight to 99 parts by weight, based on 100 parts by weight of the monomer mixture.

10. The acrylic adhesive composition of claim 1, wherein the (meth)acrylic monomer including a hydroxy group is included in 1 to 10 parts by weight, based on 100 parts by weight of the monomer mixture.

11. The acrylic adhesive composition of claim 1, wherein the curing retarder is included in an amount of 1 part by weight to 5 parts by weight, based on 100 parts by weight of the acrylic copolymer.

12. A polarizing plate comprising:
    a polarizing film; and
    an adhesive layer formed on one surface or both surfaces of the polarizing film and including a cured product of the acrylic adhesive composition of claim 1.

13. A display device comprising the polarizing plate of claim 12.

* * * * *